(12) United States Patent
Yamamoto

(10) Patent No.: US 8,059,510 B2
(45) Date of Patent: Nov. 15, 2011

(54) INFORMATION REPRODUCING DEVICE

(75) Inventor: Akira Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 511 days.

(21) Appl. No.: 12/303,221

(22) PCT Filed: Jan. 26, 2007

(86) PCT No.: PCT/JP2007/051290
§ 371 (c)(1),
(2), (4) Date: Dec. 2, 2008

(87) PCT Pub. No.: WO2007/141928
PCT Pub. Date: Dec. 13, 2007

(65) Prior Publication Data
US 2009/0196381 A1    Aug. 6, 2009

(30) Foreign Application Priority Data

Jun. 2, 2006  (JP) ................................ 2006-154352

(51) Int. Cl.
*G11B 7/00* (2006.01)
(52) U.S. Cl. ................ 369/59.22; 369/59.21; 369/59.17
(58) Field of Classification Search ............... 369/59.22, 369/59.21, 59.17
See application file for complete search history.

(56) References Cited

U.S. PATENT DOCUMENTS

| | | | |
|---|---|---|---|
| 5,517,476 A | 5/1996 | Hayashi | |
| 5,719,843 A | 2/1998 | Nakajima et al. | |
| 5,864,590 A | 1/1999 | Soubaras | |
| 2005/0122877 A1* | 6/2005 | Katayama | 369/59.22 |
| 2006/0023604 A1* | 2/2006 | Yamakawa et al. | 369/59.22 |
| 2007/0279784 A1 | 12/2007 | Yamamoto | |

FOREIGN PATENT DOCUMENTS

| | | |
|---|---|---|
| JP | 05-344008 | 12/1993 |
| JP | 07-220409 | 8/1995 |
| JP | 9-007313 | 1/1997 |
| JP | 09-330565 | 12/1997 |
| JP | 3260870 | 12/2001 |

(Continued)

OTHER PUBLICATIONS

Japanese Notice of Reasons for Rejection, w/ English translation thereof, issued in Japanese Patent Application No. JP 2008-520141 dated Feb. 8, 2011.

(Continued)

*Primary Examiner* — Latanya Bibbins
(74) *Attorney, Agent, or Firm* — McDermott Will & Emery LLP

(57) ABSTRACT

In an information reproducing device for performing maximum likelihood decoding using asynchronous sample data, data from the recording medium 101 is sampled by an A/D converter 103 at an asynchronous sampling clock generated by a clock generator 104, to obtain asynchronous sample data. A timing detector 106 detects a phase θ of the asynchronous sampling clock, where recording timings of data of the recording medium 101 are reference points. A reference value generator 108 generates reference values used in a Viterbi decoder 107, based on basic phase reference values at a phase of 0 and a phase signal θ of the asynchronous sampling clock. A basic reference value learner 109 learns and modifies the phase-0 basic reference values based on the phase signal θ, the asynchronous sample data, and the reference values.

16 Claims, 4 Drawing Sheets

100 information reproducing device

FOREIGN PATENT DOCUMENTS

| | | |
|---|---|---|
| JP | 3628790 | 12/2004 |
| WO | WO 2006/019073 A1 | 2/2006 |
| WO | WO 2007/060765 A1 | 5/2007 |

OTHER PUBLICATIONS

Okaomoto et al "Adaptive Oversampling Rate Controller in Full-digital Timing Recovery for Read Channel Systems" pp. 171-173, 2006 Optical Data Storage Topical Meeting: Conference Proceedings IEEE Catalog No. 06EX1211 Le Centre Sheraton, Montreal, Quebec, Canada Apr. 23-26, 2006.

Yamamoto et al "Robust Read Channel System Directly Processing Asynchronous Sampling Data" pp. 1054-1057 Japanese Journal of Applied Physics vol. 45, No. 2B The Japanese Society of Applied Physics Published online Feb. 24, 2006.

Yamamoto et al "A Robust Read Channel System directly processing Asynchronous Sampling Data" ISMO/ODS '05 International Symposium on Optical Memory and Optical Data Storages: Topical Meeting and Exhibit Honolulu Hawaii USA Jul. 10-14, 2005, Conference Program and technical Digest.

\* cited by examiner

INFORMATION REPRODUCING DEVICE

RELATED APPLICATIONS

This application is the US National Phase under 35 U.S.C. §371 of International Application No. PCT/JP2007/051290 filed on Jan. 26, 2007, which claims the benefit of Japanese Application No. JP 2006-154352 filed on Jun. 2, 2006, the disclosures of which Applications are incorporated by reference herein.

TECHNICAL FIELD

The present invention relates to an information reproducing device, and more particularly, to an information reproducing device employing a Viterbi algorithm.

BACKGROUND ART

Conventionally, there is an information reproducing device comprising a Viterbi decoder as described in, for example, Patent Document 1, in which synchronous sample data is obtained, and thereafter, the synchronous sample data is input to the Viterbi decoder, and most likely data is reproduced.

On the other hand, for example, as described in Patent Document 2, asynchronous sample data is directly input to a Viterbi decoder, and most likely data is reproduced.

Patent Document 1: Japanese Patent No. 3260870
Patent Document 2: Japanese Patent No. 3628790

DISCLOSURE OF THE INVENTION

Problems to be Solved by the Invention

Incidentally, a signal input to a Viterbi decoder contains noise or distortion due to various causes. If reference values used in a Viterbi decoder can be adaptively changed so as to reduce the noise or distortion, the quality of the output of the Viterbi decoder can be significantly improved.

However, when an input to a Viterbi decoder is synchronous sample data, several reference value learning methods have been proposed. Also in the technique of Patent Document 1 described above, the Viterbi decoder is caused to learn the reference value. However, there has been no proposal for asynchronous sample data.

Solution to the Problems

In view of the problems above, an object of the present invention is to correct reference values used in a Viterbi decoder to appropriate values even when an input to the Viterbi decoder is asynchronous sample data, thereby improving the quality of an output of the Viterbi decoder.

To achieve the object, according to the present invention, reference values used in Viterbi decoding of a Viterbi decoder are not previously stored, and basic reference values (where a predetermined phase is a reference point) which are used to generate the reference values are previously stored, and the basic reference values are learnt. Here, a reason why the basic reference values (where a predetermined phase is a reference point) are previously stored will be described. When an input to a Viterbi decoder is synchronous sample data, the number of reference values used in Viterbi decoding is small, but when the input is asynchronous sample data, reference values used in Viterbi decoding need to be changed, depending on a phase of the asynchronous sample data, so that the number of reference values previously stored is huge, leading to an increase in circuit scale. Therefore, in the present invention, reference values at a particular phase, such as 0, $\pi$ or the like, are previously stored as basic reference values, and reference values corresponding to the phase of the asynchronous sample data are calculated and generated from the basic reference values. Thereby, the number of previously stored reference values can be reduced, resulting in a decrease in circuit scale.

Specifically, an information reproducing device according to the present invention for receiving asynchronous sample data sampled at an asynchronous sampling clock asynchronous with a recording timing of data recorded in a recording medium and performing Viterbi decoding with respect to the input signal, includes a reference value generating circuit for receiving basic reference values at a predetermined reference phase, and generating reference values for Viterbi decoding based on the basic reference values, at a phase of the asynchronous sampling clock where the recording timing of the recorded data is a reference point, a Viterbi decoding circuit for performing maximum likelihood decoding based on the reference values generated by the reference value generating circuit and the input signal, and a basic reference value learning circuit for learning and modifying the basic reference values based on errors between the reference values at the phase of the asynchronous sampling clock generated by the reference value generating circuit and the input signal, and the phase of the asynchronous sampling clock.

In the information reproducing device of the present invention, the reference value generating circuit generates the reference value for Viterbi decoding based on two basic reference values corresponding to two consecutive data of the input signal to the Viterbi decoding circuit.

The information reproducing device of the present invention includes a timing detecting circuit for detecting a phase of the asynchronous sampling clock, where the recording timing of data recorded in the recording medium is a reference point. The reference value generating circuit generates the reference value for Viterbi decoding based on the phase of the asynchronous sampling clock detected by the timing detecting circuit and two basic reference values corresponding to two consecutive data of the input signal to the Viterbi decoding circuit.

In the information reproducing device of the present invention, the reference value generating circuit generates the reference value for Viterbi decoding by linear interpolation between the two basic reference values where the predetermined phase is a reference point, depending on the asynchronous sampling clock detected by the timing detecting circuit.

In the information reproducing device of the present invention, the reference value generating circuit generates the reference value for Viterbi decoding based on the following expression.

$$r_{abcde}(\theta) = f(R_{abcd}, R_{bcde}, \theta)$$
$$= (1-\theta) \cdot R_{abcd} + \theta \cdot R_{bcde}$$
$$a, b, c, d, e = \{0, 1\}$$

(where abcd and bcde represent two consecutive data of the input signal)

In the information reproducing device of the present invention, the basic reference value where the predetermined phase is a reference point is a phase-0 basic reference value where a phase of 0 is a reference point.

In the information reproducing device of the present invention, the basic reference value where the predetermined phase is a reference point is a phase-π basic reference value where a phase of π is a reference point.

In the information reproducing device of the present invention, the basic reference value learning circuit modifies the two basic reference values used for generation of the reference value by the reference value generating circuit, based on errors between the reference values generated by the reference value generating circuit and the input signal.

In the information reproducing device of the present invention, the basic reference value learning circuit modifies the two basic reference values used for generation of the reference value, based on the following expression.

$$\Delta R_{abcd} = \mu(x - r_{abcde})(1-\theta)$$

$$\Delta R_{bcde} = \mu(x - r_{abcde})\theta$$

(where abcd and bcde represent two consecutive data of the input signal)

An information reproducing device according to the present invention includes a clock generating circuit for generating an asynchronous sampling clock asynchronous with a recording timing of data recorded in a recording medium, an A/D conversion circuit for sampling recorded data from the recording medium at the asynchronous sampling clock of the clock generating circuit, a timing detecting circuit for detecting a phase of the asynchronous sampling clock, where the recording timing of data recorded in the recording medium is a reference point, a reference value generating circuit for receiving the phase of the asynchronous sampling clock detected by the timing detecting circuit, and basic reference values where a predetermined phase is a reference point, and generating reference values for Viterbi decoding based on the basic reference values and the phase of the asynchronous sample clock, a Viterbi decoding circuit for performing maximum likelihood decoding based on asynchronous sample data sampled by the A/D conversion circuit and the reference value of the reference value generating circuit, and a basic reference value learning circuit previously having basic reference values where the predetermined phase is a reference point, and for learning the basic reference values based on the phase of the asynchronous sample clock detected by the timing detecting circuit and the asynchronous sample data sampled by the A/D conversion circuit, and the reference value for Viterbi decoding generated by the reference value generating circuit.

In the information reproducing device of the present invention, the basic reference value learning circuit selects basic reference values to be learnt, using an intermediate result of a surviving path managing unit included in the Viterbi decoding circuit.

In the information reproducing device of the present invention, the basic reference value learning circuit selects basic reference values to be learnt, using one having a minimum value of path metrics calculated by the Viterbi decoding circuit.

In the information reproducing device of the present invention, the basic reference value learning circuit selects basic reference values to be learnt, using a provisionally determined value obtained by provisionally determining an output value of the Viterbi decoding circuit based on the input signal to the Viterbi decoding circuit.

In the information reproducing device of the present invention, the basic reference value learning circuit selects basic reference values to be learnt, by selecting any one of an output of the Viterbi decoding circuit, an intermediate result of a surviving path managing unit included in the Viterbi decoding circuit, one having a minimum value of path metrics calculated by the Viterbi decoding circuit, and a provisionally determined value obtained by provisionally determining an output value of the Viterbi decoding circuit based on the input signal to the Viterbi decoding circuit.

An information reproducing device according to the present invention includes a clock generating circuit for generating an asynchronous sampling clock asynchronous with a recording timing of data recorded in a recording medium, an A/D conversion circuit for sampling the recorded data from the recording medium by the asynchronous sampling clock of the clock generating circuit, an input terminal for inputting basic reference values where a predetermined phase is a reference point, a Viterbi decoding circuit for performing maximum likelihood decoding based on errors between asynchronous sample data sampled by the A/D conversion circuit and reference values generated, depending on the basic reference values input to the input terminal, and a basic reference value learning circuit for learning and modifying the basic reference values based on errors between the asynchronous sample data sampled by the A/D conversion circuit and the reference values generated, depending on the basic reference values input to the input terminal, and the phase of the asynchronous sample data where the recording timing of data recorded in the recording medium is a reference point.

Thus, in the information reproducing device of the present invention, analog data read out from a recording medium is sampled at an asynchronous sampling clock, and the resultant asynchronous sample data is used in maximum likelihood decoding by the Viterbi decoding circuit. In the maximum likelihood decoding, the asynchronous sample data has a phase, where the recording timings of data of the recording medium are reference points, and therefore, reference values used in the maximum likelihood decoding also correspond to the phase. In addition, basic reference values where a predetermined phase is a reference point are learnt and modified based on errors between the asynchronous sample data input to the Viterbi decoding circuit and the reference values, and thereafter, the reference value generating circuit repeatedly generates the reference values based on the modified basic reference values, so that the generated reference values adaptively approach appropriate values.

Effect of the Invention

As described above, according to the information reproducing device of the present invention, even in the case of asynchronous sampling methods, reference values can be adaptively modified, so that the quality of an output of a Viterbi decoder can be significantly improved, resulting in higher accuracy of reproduced data.

BRIEF DESCRIPTION OF THE DRAWINGS

FIG. 4(a) shows two phase-0 basic reference values to be learnt, FIG. 4(b) shows learning of two phase-0 basic reference values to be learnt, depending on an error between a reference value at a phase θ and an input signal value x of a Viterbi decoder, and FIG. 4(c) shows two phase-0 basic reference values after learning.

DESCRIPTION OF THE REFERENCE CHARACTERS

- 101 recording medium
- 102 analog front end
- 103 A/D converter (A/D conversion circuit)
- 104 clock generator (clock generating circuit)
- 105 waveform shaper
- 106 timing detector (timing detecting circuit)
- 107 Viterbi decoder (Viterbi decoding circuit)
- 108 reference value generator (reference value generating circuit)
- 109 basic reference value learner (basic reference value learning circuit)
- IN input terminal

BEST MODE FOR CARRYING OUT THE INVENTION

Hereinafter, an embodiment of the present invention will be described in detail with reference to the accompanying drawings.

Figure 1:
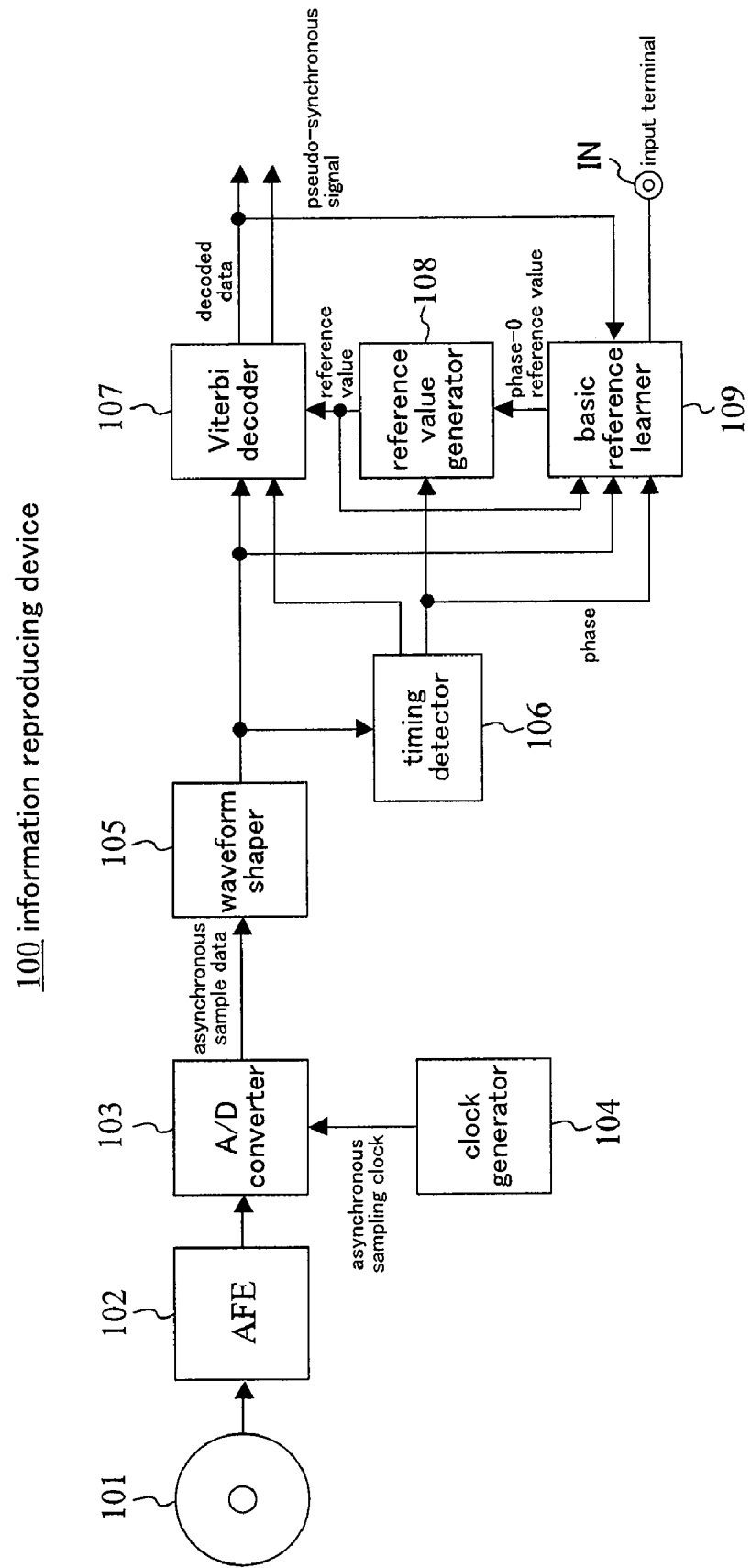
FIG. 1 is a diagram schematically showing a whole configuration of an information reproducing device according to an embodiment of the present invention.

A schematic whole configuration of an information reproducing device according to this embodiment is shown in FIG. 1.

The information reproducing device 100 of this embodiment reproduces data recorded in a recording medium 101, such as a DVD or the like, and a pseudo-synchronous clock whose rising or falling timings are pseudo-synchronous with recording timings of the recorded data. The information reproducing device 100 has an AFE (Analog Front End) 102, an A/D converter 103, a clock generator (clock generating circuit) 104, a waveform shaper 105, a timing detector (timing detecting circuit) 106, a Viterbi decoder (Viterbi decoding circuit) 107, a reference value generator (reference value generating circuit) 108, and a basic reference value learner (basic reference value learning circuit) 109.

Firstly, outlines of an internal configuration and an operation of the information reproducing device 100 will be described. Digital data recorded in the recording medium 101 is read out as an analog signal by an optical pickup (not shown). The analog signal is shaped by the AFE 102, and is converted into digital data by the A/D converter 103. A sampling clock of the A/D converter 103 is a clock generated by the clock generator 104. The rising or falling timings of the clock are not necessarily synchronous with the timings of data recorded in the recording medium 101. In other words, the clock is an asynchronous sampling clock. Also, the digital data output by the A/D converter 103 can be referred to as asynchronous sample data. The asynchronous sample data is waveform-shaped by the waveform shaper 105, and the resultant data is input to the timing detector 106 and the Viterbi decoder 107.

The timing detector 106 generates and outputs two kinds of signals from the waveform-shaped digital data. One kind of signal is a phase signal θ of rising edges of an asynchronous sampling clock, where each of the recording timings of digital data recorded in the recording medium 101 is a reference point, and the other kind of signal is a pseudo-synchronous signal whose rising edges are pseudo-synchronous with the recording timings of digital data recorded in the recording medium 101.

The Viterbi decoder 107 decodes most likely data by retrieving a reference value sequence that is closest to the waveform-shaped digital data sequence. Both the waveform-shaped digital data and the reference values are asynchronous with digital data recorded in the recording medium 101. However, decoded data are pseudo-synchronized with the recorded digital data by using a pseudo-synchronous signal output by the timing detector 106. Specifically, the Viterbi decoder 107 performs not only maximum likelihood decoding, but also, simultaneously, conversion from asynchronous sample data to synchronous data.

The reference values used by the Viterbi decoder 107 are generated by the reference value generator 108. The reference value generator 108 generates the reference values based on a phase θ signal (described below) detected by the timing detector 106 and basic reference values of the basic reference value learner 109. The basic reference value learner 109 previously stores the basic reference values, where a predetermined phase (e.g., a phase of 0) is a reference point. Further, the basic reference value learner 109 receives and stores basic reference values from a predetermined input terminal IN of a semiconductor chip, and adaptively learns the stored basic reference values based on an input signal (i.e., asynchronous sample data) and output data of the Viterbi decoder 107, and the phase θ. By this learning, the error rate of decoded data from the Viterbi decoder 107 is reduced.

Note that the waveform shaper 105, the timing detector 106, the Viterbi decoder 107, the reference value generator 108, and the basic reference value learner 109 are operated with rising or falling edges of an asynchronous sampling clock generated by the clock generator 104.

Next, operations of the timing detector 106, the Viterbi decoder 107, the reference value generator 108, and the basic reference value learner 109 will be described in detail.

Figure 2:
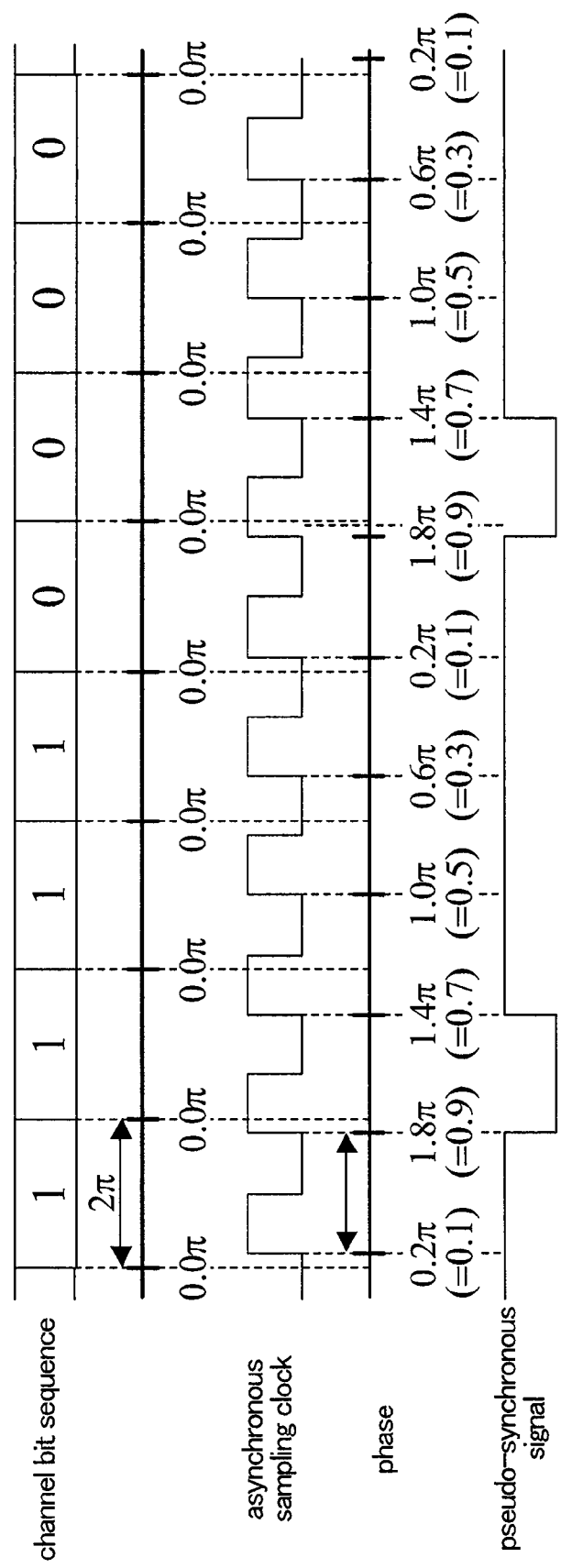
FIG. 2 is a diagram for describing an operation of a timing detector included in the information reproducing device of this embodiment.

Firstly, a configuration and an operation of the timing detector 106 will be described in detail with reference to FIG. 2. In FIG. 2, it is assumed that one cycle of channel bits is $2\pi$, and the points of boundaries between each channel bit are each $0\pi$ (i.e., a phase of 0). The rising edges of the asynchronous sampling clock generated by the clock generator 104 are not synchronous with timings at which channel bit boundaries appear, as its name suggests. When the timing relationship between the channel bits and the asynchronous sampling clock is as shown in FIG. 2, the position of the first rising edge of the asynchronous sampling clock is $0.2\pi$. The next rising edge is $1.8\pi$, the next is $1.4\pi$, and so on. In order to facilitate hardware implementation, it is effective to normalize the rising edge positions by dividing by $2\pi$ into 0.1, 0.9, 0.7, and so on.

The pseudo-synchronous signal generated by the timing detector 106 is 1 when the phase exceeds $2\pi$, and 0 when otherwise. Since the channel bits and the rising edges of the asynchronous sampling clock are asynchronous, the number of the channel bits and the number of the rising edges of the asynchronous sampling clock are not equal to each other as they are. If the rising edges of the asynchronous sampling clock when the value of the pseudo-synchronous signal is 0 are removed, the number of the channel bits and the number of the rising edges of the asynchronous sampling clock may be caused to be equal to each other.

Next, configurations and operations of the Viterbi decoder 107 and the reference value generator 108 will be described in detail.

It is assumed that the recorded data are obtained by NRZI (Non Return to Zero Inverse) conversion of (2, 10) RLL (Run Length Limited) codes, for the sake of simplicity. Specifically, the recorded data sequence includes sequences of at least three consecutive "1"s and at least three consecutive "0"s. In other words, there are no data sequences, such as "0101", "0110" and the like. In this case, there are eight states derived from the recorded data sequence.

It is also assumed that an input to the Viterbi decoder 107 when it is perfectly synchronously sampled and ideally waveform-shaped has the PR (3, 4, 4, 3) characteristic. In this case, the input can take five values {0, 3, 7, 11, 14}.

A correspondence between the eight states and the five values is represented by the following expression.

$R_{0000}=0$ $R_{0001}=3$ $R_{0011}=7$ $R_{0111}=11$ $R_{1000}=3$ $R_{1100}=7$ $R_{1110}=11$ $R_{1111}=14$ (Expression 1)

The eight values are referred to as phase-0 basic reference values (basic reference values where a phase of 0 is a reference point). The subscripts 0000, 0001, ... of the eight phase-0 basic reference values R indicate a data input sequence of consecutive convoluted codes including four pieces of data. For example, when a data sequence is abcdefg...=0000111..., the subscript 0000 indicates abcd (0000=abcd), the next subscript 0001 indicates a data sequence of channel bits advanced by one, i.e., bcde (0001=bcde).

Although it has been assumed in this embodiment that the phase-0 basic reference values R are basic reference values, basic reference values (phase-π basic reference values) can be employed, where a phase of π is a reference point. Alternatively, basic reference values can be employed, where other phases are reference points.

Actual input data to the Viterbi decoder 107 are not perfectly synchronously sampled. In this embodiment, the input data are asynchronous sample data. Therefore, when branch metrics are obtained, the phase-0 basic reference values R as they are cannot be used. Reference values r need to be obtained, depending on a phase as they are sampled.

Figure 3:
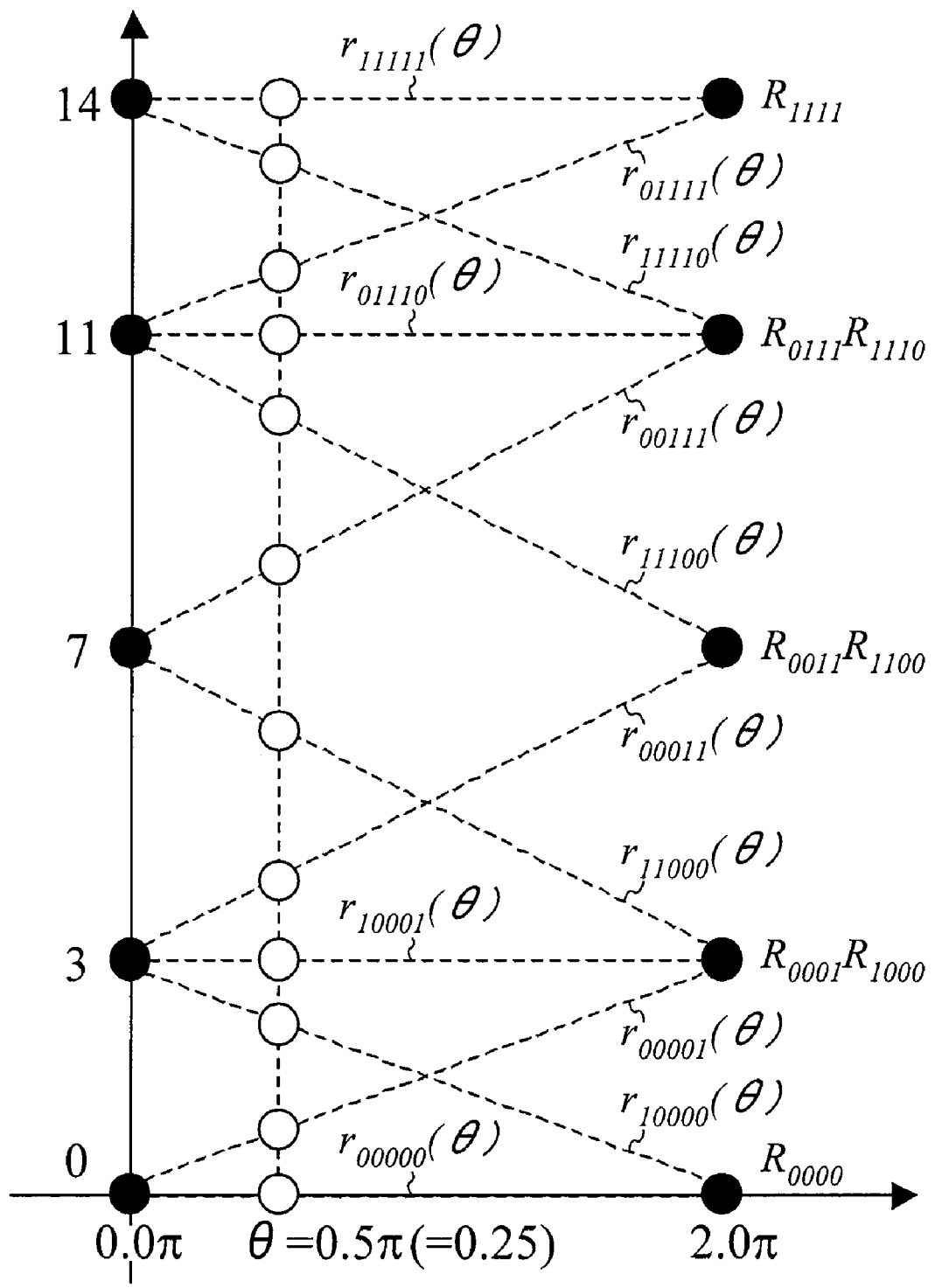
FIG. 3 is a diagram schematically showing a method for calculating reference values using a reference value generator included in the information reproducing device of this embodiment.

FIG. 3 shows a method for generating reference values r using the reference value generator 108. In FIG. 3, closed circles indicate phase-0 basic reference values. There are eight phase-0 basic reference values. Since it is assumed that the eight phase-0 basic reference values are ideally equalized into PR (3, 4, 4, 3), the eight phase-0 basic reference values are reduced to five phase-0 basic reference values. Dashed lines connecting between closed circles indicate reference values. There are twelve reference values each including five bits. For example, a reference value $r_{00001}$ is obtained from two phase-0 basic reference values $R_{0000}$ and $R_{0001}$ corresponding to two consecutive data, where a phase θ is a parameter. Reference values where the phase θ is 0.5π (i.e., 0.25 when it is normalized) are indicated by open circles. The reference values are calculated by the following expression.

$$r_{abcde}(\theta) = f(R_{abcd}, R_{bcde}, \theta)$$
$$= (1-\theta) \cdot R_{abcd} + \theta \cdot R_{bcde}$$

$a, b, c, d, e = \{0, 1\}$ (Expression 2)

The other reference values are similarly calculated.

Although it is, for example, here assumed that the reference values are obtained by linear interpolation, other interpolation methods may be employed.

Branch metrics are calculated based on the calculated reference values and the values of input data to the Viterbi decoder 107 by the following expression.

$$bm_{abcde}=(x-r_{abcde}(\theta))^2$$

$a,b,c,d,e=\{0,1\}$ (Expression 3)

In this expression, x represents the value of an input signal to the Viterbi decoder 107, and bm represents a branch metric.

When the value of the pseudo-synchronous signal is 0, the branch metrics are accumulated. When the value of the pseudo-synchronous signal is 1, path metrics and path selection signals are calculated. Thereafter, the values of output data of the Viterbi decoder 107 are determined from the path selection signals.

Finally, learning of the phase-0 basic reference values R by the basic reference value learner 109 will be described in detail.

As described above, the reference value r is obtained from the phase-0 basic reference values R and the phase θ. Learning is performed with respect to the phase-0 basic reference values R. The phase-0 basic reference values R are modified based on errors (x−r) between the Viterbi input values x and the generated reference values r, and the phase θ. The modification is represented by the following expression.

$$\Delta R_{abcd}=\mu(x-r_{abcde})(1-\theta)$$

$$\Delta R_{bcde}=\mu(x-r_{abcde})\theta$$ (Expression 4)

Figure 4:
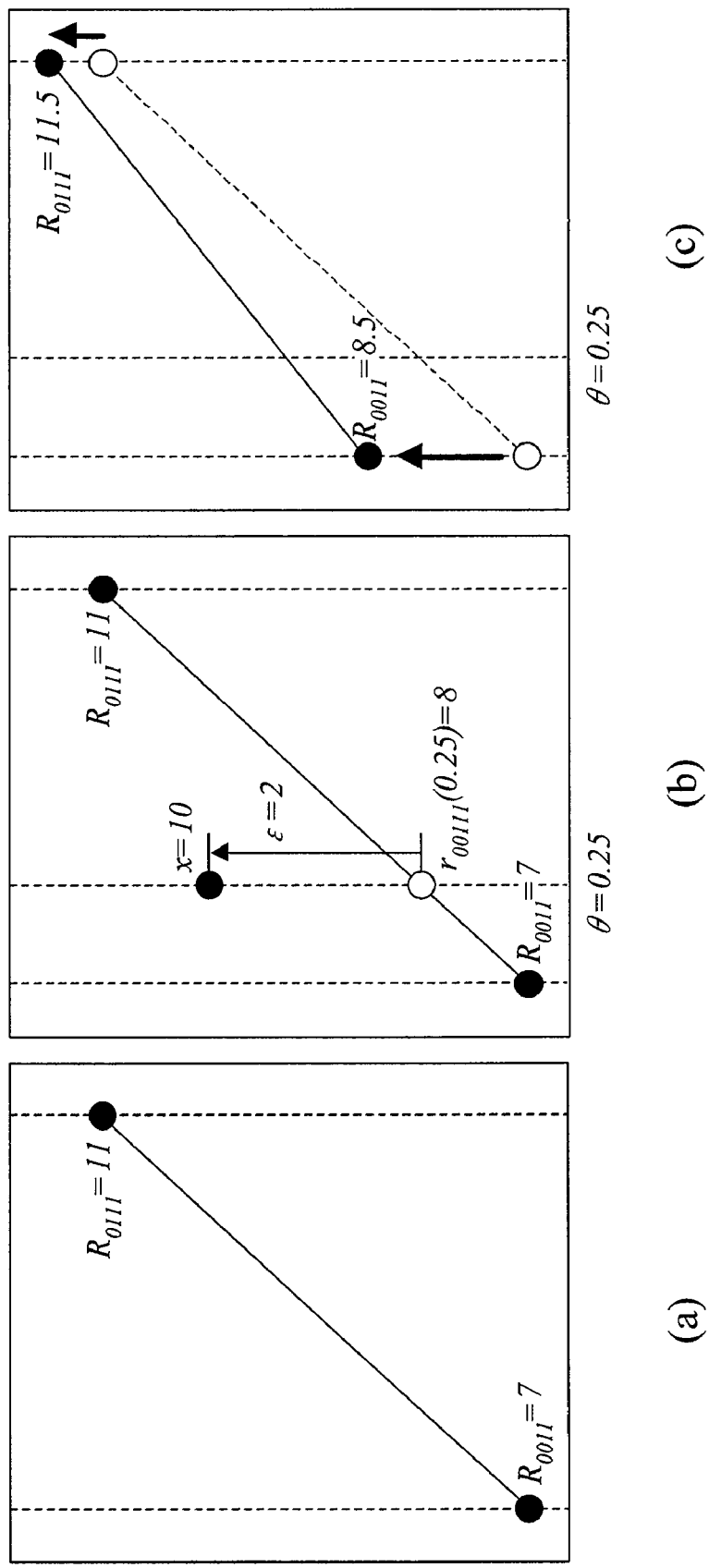
FIG. 4 is a diagram showing learning of basic reference values by a basic reference value learner included in the information reproducing device of this embodiment.

In this expression, μ represents a positive coefficient. Here, a subscript abcde represents a most likely data sequence. After the most likely data sequence abcde is obtained from an output of the Viterbi decoder 107 or the like, a reference value $r_{abcde}$ corresponding thereto, the Viterbi input value x, and the phase θ are obtained, and a modification value ΔR of the phase-0 basic reference value R is calculated. An example is shown in FIG. 4. In FIG. 4, as indicated in (a), a phase-0 basic reference value $R_{0011}$ corresponding to a data sequence 0011 and a phase-0 basic reference value $R_{0011}$ corresponding to the next data sequence 0111 following the data sequence where the channel bits are advanced by one bit, are modified. As shown in (b) of FIG. 4, the reference value $r_{abcde}=r_{00111}$ (0.25) (=8) when the phase θ of an asynchronous sampling clock is 0.5π (i.e., 0.25 when it is normalized), the input signal value x=10 of the Viterbi decoder 107, and the coefficient μ having a predetermined value are substituted into Expression 4. In this case, as shown in (c) of FIG. 4, for example, $\Delta R_{abcd}=\Delta R_{0011}=1.5$ and $\Delta R_{bcde}=\Delta R_{0111}=0.5$ are calculated, so that the phase-0 basic reference value $R_{abcd}=R_{0011}=8.5$ after learning and the phase-0 basic reference value $R_{bcde}=R_{0111}=11.5$ after learning are obtained.

Thus, according to Expression 4 for learning above, when the two phase-0 basic reference values $R_{abcd}$ and $R_{bcde}$ corresponding to two consecutive data sequences abcd and bcde are learnt, the phase-0 basic reference value $R_{abcd}=R_{0011}$ closer to the phase θ is modified to a large extent and the phase-0 basic reference value $R_{bcde}=R_{0111}$ farther to the phase θ is modified to a small extent, as can be seen from FIG. 4(c).

Although learning is performed based on the learning expression 4 in this embodiment, the present invention is not limited to this. Alternatively, for example, not both of the two phase-0 basic reference values $R_{abcd}$ and $R_{bcde}$ are modified, and instead, only one phase-0 basic reference value may be modified using other learning expressions.

Next, a theory based on which Expression 4 above is derived will be described.

A method for sequentially calculating optimal reference values when n Viterbi input data are given will be described. Firstly, an error function E as follows will be considered.

$$E = \frac{1}{2}\sum_{k=1}^{n}(x(kT_s) - r_{ML}(kT_s))^2 \quad \text{(Expression 5)}$$

In this expression, k represents an integer, Ts represents a cycle of an asynchronous sampling clock, x(kTs) represents an input data to the Viterbi decoder 107 at time kTs, and rML(kTs) represents a most likely reference value at time kTs.

A procedure for minimizing such an error function E is generally called the least mean square (LMS) method. Since the reference value rML(kTs) is determined based on two phase-0 basic reference values $R_{ijkl}$ and $R_{jklm}$, the error function E is implicitly defined with respect to the phase-0 basic reference values. Therefore, if a space defined by the phase-0 basic reference values as axes is considered, and moreover, a value defined by the error function E is considered as a height, the error function E forms an error surface as a hypersurface in the phase-0 basic reference value space. In order to reach from any phase-0 basic reference values to a minimum point on the error surface, each phase-0 basic reference value may be changed by an amount proportional to $\partial E/\partial R_{abcd}$ in each step.

$$\Delta R_{abcd} = -\mu \frac{\partial E}{\partial R_{abcd}} \quad \text{(Expression 6)}$$

$$(\mu > 0)$$

This means approaching in the steepest direction on the error surface. Such a learning rule is generally called the gradient decent method.

In the case of the definition above, Expression 6 can be expanded using a differentiation formula of a composite function as follows.

$$\frac{\partial E}{\partial R_{abcd}} = \sum_{k=1}^{n} \frac{\partial E}{\partial r_{ML}(kT_s)} \cdot \frac{\partial r_{ML}(kT_s)}{\partial R_{abcd}} \quad \text{(Expression 7)}$$

$$\frac{\partial E}{\partial r_{ML}(kT_s)} = -(x(kT_s) - r_{ML}(kT_s)) \quad \text{(Expression 8)}$$

$$\frac{\partial r_{ML}(kT_s)}{\partial R_{abcd}} = \begin{cases} 1 - \theta(kT_s), & \text{if } ML = abcde \\ \theta(kT_s), & \text{if } ML = eabcd \\ 0, & \text{otherwise} \end{cases}$$

Therefore, the learning rule is eventually obtained from Expression 6.

$$\Delta R_{abcd} = \quad \text{(Expression 9)}$$

$$\begin{cases} \mu \sum_{k=1}^{n}(x(kT_s) - r_{ML})(1 - \theta(kT_s)), & \text{if } ML = abcde \\ \mu \sum_{k=1}^{n}(x(kT_s) - r_{ML})\theta(kT_s), & \text{if } ML = eabcd \\ 0, & \text{otherwise} \end{cases}$$

In the method of Expression 9, the coefficient is changed only after all n points are given. If the coefficient μ is sufficiently small, the coefficient may be changed every time each point is given, i.e., in an iterative manner.

$$\Delta R_{abcd} = \quad \text{(Expression 10)}$$

$$\begin{cases} \mu(x(kT_s) - r_{ML})(1 - \theta(kT_s)), & \text{if } ML = abcde \\ \mu(x(kT_s) - r_{ML})\theta(kT_s), & \text{if } ML = eabcd \\ 0, & \text{otherwise} \end{cases}$$

Also in this case, a change amount as a whole is substantially equal to that of the gradient descent method. In addition, a smaller memory can be used for simulation.

In the theoretical expression above, a most likely data sequence ML is used as a condition for obtaining the phase-0 basic reference value R to be learnt. However, in the case of implementation, it is easier to select the phase-0 basic reference value R to be learnt after the most likely data sequence ML is determined. In this case, after the most likely data sequence ML is determined, two phase-0 basic reference values are simultaneously updated. An updating expression when the most likely data sequence ML is abcde is the learning expression 4 above.

The most likely data sequence ML can be obtained from output data of the Viterbi decoder 107. However, since the output data are largely delayed from the amplitude and phase of input data of the Viterbi decoder 107, a long delay adjuster is required. In this case, there is a disadvantage in terms of area and power, and in addition, stability is reduced due to a long feedback loop. To solve this, a likely data sequence may be obtained from an intermediate result of the path memory. In this case, the likelihood is poor, but the delay adjuster can be reduced by an amount corresponding to the length of the path memory, so that the loop can also be reduced. Moreover, a likely data sequence may be obtained from a minimum path metric value, or a likely data sequence may be provisionally determined from an input signal of the Viterbi decoder 107. It may be determined from what a likely data sequence is obtained, depending on required specifications. The above-described plural methods for obtaining a likely data sequence may be prepared and any one of them may be selected, depending on the situation, i.e., the methods for obtaining a likely data sequence may be dynamically changed.

Although it has been described above that data is reproduced from a DVD, the present invention can be similarly applied to a mobile telephone, an accumulation/reproduction device, a digital television, an in-car device, and the like.

INDUSTRIAL APPLICABILITY

As described above, the present invention generates reference values for use in Viterbi decoding based on basic reference values, and has a function of learning the basic reference values, and therefore, is useful as an information reproducing device capable of high-accuracy error correction.

The invention claimed is:

1. An information reproducing device for receiving asynchronous sample at an asynchronous sampling clock asynchronous with a recording timing of data recorded in a recording medium and performing Viterbi decoding with respect to an input signal, the device comprising:

a reference value generating circuit for receiving basic reference values at a predetermined reference phase, and generating reference values for Viterbi decoding based on the basic reference values, at a phase of the asynchronous sampling clock where the recording timing of the record data is a reference point;

a Viterbi decoding circuit for performing maximum likelihood decoding based on the reference values generated by the reference value generating circuit and the input signal; and a basic reference value learning circuit for learning and modifying the basic reference values based on errors between the reference values at the phase of the asynchronous sampling clock generated by the reference value generating circuit and the input signal, and the phase of the asynchronous sampling clock.

2. The information reproducing device of claim 1, wherein the reference value generating circuit generates the reference value for Viterbi decoding based on two basic reference values corresponding to two consecutive data of the input signal to the Viterbi decoding circuit.

3. The information reproducing device of claim 2, wherein the basic reference value where the predetermined phase is a reference point is a phase-0 basic reference value where a phase of 0 is a reference point.

4. The information reproducing device of claim 2, wherein the basic reference value where the predetermined phase is a reference point is a phase-π basic reference value where a phase of π is a reference point.

5. The information reproducing device of claim 1, comprising:

a timing detecting circuit for detecting a phase of the asynchronous sampling clock, where the recording timing of data recorded in the recording medium is a reference point, wherein the reference value generating circuit generates the reference value for Viterbi decoding based on the phase of the asynchronous sampling clock detected by the timing detecting circuit and two basic reference values corresponding to two consecutive data of the input signal to the Viterbi decoding circuit.

6. The information reproducing device of claim 5, wherein the reference value generating circuit generates the reference value for Viterbi decoding by linear interpolation between the two basic reference values where the predetermined phase is a reference point, depending on the asynchronous sampling clock detected by the timing detecting circuit.

7. The information reproducing device of claim 6, wherein the reference value generating circuit generates the reference value for Viterbi decoding based on:

$$r_{abcde}(\theta) = f(R_{abcd}, R_{bcde}, \theta)$$
$$= (1-\theta) \cdot R_{abcd} + \theta \cdot R_{bcde}$$
$$a, b, c, d, e = \{0, 1\}$$

where abcde represents a data sequence comprising consecutive bits, abcd represents the consecutive bits obtained by removing a newest bit from the data sequence, bcde represents the consecutive bits obtained by removing an oldest bit from the data sequence, $R_{abcde}$ represents the reference value, $R_{abcd}$ and $R_{bcde}$ represent the basic reference values, and θ represents a phase of the asynchronous sampling clock.

8. The information reproducing device of claim 5, wherein the basic reference value learning circuit modifies the two basic reference values used for generation of the reference value by the reference value generating circuit, based on errors between the reference values generated by the reference value generating circuit and the input signal.

9. The information reproducing device of claim 8, wherein the basic reference value learning circuit modifies the two basic reference values used for generation of the reference value, based on:

$$\Delta R_{abcd} = \mu(x - r_{abcde})(1-\theta)$$

$$\Delta R_{bcde} = \mu(x - r_{abcde})\theta$$

where abcde represents a data sequence comprising consecutive bits, abcd represents the consecutive bits obtained by removing a newest bit from the data sequence, bcde represents the consecutive bits obtained by removing an oldest bit from the data sequence, $\Delta R_{abcd}$ and $\Delta R_{bcde}$ represent an amount of change of the basic reference values, $r_{abcde}$ represents the reference value, μ represents a learning coefficient, x represents an input signal when maximum likelihood decoding is performing with respect to the data sequence abcde, and θ represents a phase of the asynchronous sampling clock.

10. The information reproducing device of claim 1, wherein the basic reference value learning circuit selects basic reference values to be learnt, using an output of the Viterbi decoding circuit.

11. The information reproducing device of claim 1, wherein the basic reference value learning circuit selects basic reference values to be learnt, using an intermediate result of a surviving path managing unit included in the Viterbi decoding circuit.

12. The information reproducing device of claim 1, wherein the basic reference value learning circuit selects basic reference values to be learnt, using one having a minimum value of path metrics calculated by the Viterbi decoding circuit.

13. The information reproducing device of claim 1, wherein the basic reference value learning circuit selects basic reference values to be learnt, using a provisionally determined value obtained by provisionally determining an output value of the Viterbi decoding circuit based on the input signal to the Viterbi decoding circuit.

14. The information reproducing device of claim 1, wherein the basic reference value learning circuit selects basic reference values to be learnt, by selecting any one of an output of the Viterbi decoding circuit, an intermediate result of a surviving path managing unit included in the Viterbi decoding circuit, one having a minimum value of path metrics calculated by the Viterbi decoding circuit, and a provisionally determined value obtained by provisionally determining an output value of the Viterbi decoding circuit based on the input signal to the Viterbi decoding circuit.

15. An information reproducing device comprising:

a clock generating circuit for generating an asynchronous sampling clock asynchronous with a recording timing of data recorded in a recording medium;

an A/D conversion circuit for sampling the recorded data from the recording medium by the asynchronous sampling clock of the clock generating circuit;

a timing detecting circuit for detecting a phase of the asynchronous sampling clock, where the recording timing of data recorded in the recording medium is a reference point;

a reference value generating circuit for receiving the phase of the asynchronous sampling clock detected by the timing detecting circuit, and basic reference values where a predetermined phase is a reference point, and generating a reference value for Viterbi decoding based on the basic reference values and the phase of the asynchronous sample clock;

a Viterbi decoding circuit for performing maximum likelihood decoding based on asynchronous sample data sampled by the A/D conversion circuit and the reference value of the reference value generating circuit; and a basic reference value learning circuit previously having basic reference values where the predetermined phase is a reference point, and for learning the basic reference values based on the phase of the asynchronous sample clock detected by the timing detecting circuit and the asynchronous sample data sampled by the A/D conversion circuit, and the reference value for Viterbi decoding generated by the reference value generating circuit.

16. An information reproducing device comprising:

a clock generating circuit for generating an asynchronous sampling clock asynchronous with a recording timing of data recorded in a recording medium;

an A/D conversion circuit for sampling the recorded data from the recording medium by the asynchronous sampling clock of the clock generating circuit; an input terminal for inputting basic reference values where a predetermined phase is a reference point;

a Viterbi decoding circuit for performing maximum likelihood decoding based on errors between asynchronous sample data sampled by the A/D conversion circuit and reference values generated, depending on the basic reference values input to the input terminal; and a basic reference value learning circuit for learning and modifying the basic reference values based on errors between the asynchronous sample data sampled by the A/D conversion circuit and the reference values generated, depending on the basic reference values input to the input terminal, and the phase of the asynchronous sample data where the recording timing of data recorded in the recoding medium is a reference point.

* * * * *